United States Patent
Dropps et al.

(10) Patent No.: US 7,466,700 B2
(45) Date of Patent: Dec. 16, 2008

(54) LUN BASED HARD ZONING IN FIBRE CHANNEL SWITCHES

(75) Inventors: Frank R. Dropps, Maple Grove, MN (US); William J Gustafson, Apple Valley, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 586 days.

(21) Appl. No.: 10/894,492

(22) Filed: Jul. 20, 2004

(65) Prior Publication Data

US 2005/0018672 A1    Jan. 27, 2005

Related U.S. Application Data

(60) Provisional application No. 60/503,812, filed on Sep. 19, 2003, provisional application No. 60/537,933, filed on Jan. 21, 2004, provisional application No. 60/488,757, filed on Jul. 21, 2003, provisional application No. 60/532,965, filed on Dec. 29, 2003, provisional application No. 60/504,038, filed on Sep. 19, 2003, provisional application No. 60/495,212, filed on Aug. 14, 2003, provisional application No. 60/495,165, filed on Aug. 14, 2003, provisional application No. 60/503,809, filed on Sep. 19, 2003, provisional application No. 60/505,381, filed on Sep. 23, 2003, provisional application No. 60/505,195, filed on Sep. 23, 2003, provisional application No. 60/557,613, filed on Mar. 30, 2004, provisional application No. 60/505,075, filed on Sep. 23, 2003, provisional application No. 60/504,950, filed on Sep. 19, 2003, provisional application No. 60/532,967, filed on Dec. 29, 2003, provisional application No. 60/532,966, filed on Dec. 29, 2003, provisional application No. 60/550,250, filed on Mar. 4, 2004, provisional application No. 60/569,436, filed on May 7, 2004, provisional application No. 60/532,963, filed on Dec. 29, 2003, provisional application No. 60/572,197, filed on May 18, 2004.

(51) Int. Cl.
H04L 12/56    (2006.01)

(52) U.S. Cl. ................. 370/389; 370/422; 370/425

(58) Field of Classification Search ................. 370/389, 370/429, 395, 367, 392, 265, 368, 382, 378; 709/220, 223, 9
See application file for complete search history.

(56) References Cited

U.S. PATENT DOCUMENTS 4,081,612 A    3/1978    Hafner (Continued)

FOREIGN PATENT DOCUMENTS

EP    0649098    9/1994

(Continued)

OTHER PUBLICATIONS

"Office Action from USPTO dated Mar. 20, 2008 for U.S. Appl. No. 10/894,732".

(Continued)

*Primary Examiner*—Aung S Moe
*Assistant Examiner*—Awet Haile
(74) *Attorney, Agent, or Firm*—Klein, O'Neill & Singh, LLP

(57) ABSTRACT

A method and system for implementing LUN based hard zoning in a fiber channel network is provided. A LUN field in a Fiber Channel SCSI command frame is compared with a list of LUNS that are allowed for a particular frame source; and the frame is forwarded if the LUN is allowed for the frame source. The comparison is performed by a port receiving the frame by using an address look up table ("ALUT"). Hard zoning is based on various frame fields and/or ALUT control codes. Also provided is a method for processing a reply to a SCSI REPORT LUN command from an initiator. The method includes, intercepting a reply to a REPORT LUN command; editing the reply to remove unauthorized LUNs; and sending the edited reply to the initiator.

25 Claims, 14 Drawing Sheets

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,980,857 A | 12/1990 | Walter et al. | |
| 5,025,370 A | 6/1991 | Koegel et al. | |
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,260,935 A | 11/1993 | Turner | |
| 5,339,311 A | 8/1994 | Turner | |
| 5,367,520 A | 11/1994 | Cordell | 370/60 |
| 5,390,173 A | 2/1995 | Spinney et al. | |
| 5,537,400 A | 7/1996 | Diaz et al. | |
| 5,568,165 A | 10/1996 | Kimura | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,666,483 A | 9/1997 | McClary | |
| 5,677,909 A | 10/1997 | Heide | |
| 5,687,172 A | 11/1997 | Cloonan et al. | 370/395 |
| 5,732,206 A | 3/1998 | Mendel | |
| 5,748,612 A | 5/1998 | Stoevhase et al. | 370/230 |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,936,442 A | 8/1999 | Liu et al. | |
| 5,954,796 A | 9/1999 | McCarty et al. | |
| 5,974,547 A | 10/1999 | Klimenko | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,031,842 A | 2/2000 | Trevitt et al. | |
| 6,046,979 A | 4/2000 | Bauman | |
| 6,047,323 A | 4/2000 | Krause | 709/227 |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,134,127 A | 10/2000 | Kirchberg | |
| 6,144,668 A | 11/2000 | Bass et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 | 2/2001 | Berman | |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 * | 7/2002 | Blumenau et al. | 709/213 |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,467,008 B1 | 10/2002 | Gentry et al. | 710/261 |
| 6,470,026 B1 | 10/2002 | Pearson et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 | 9/2003 | Black et al. | |
| 6,622,206 B1 | 9/2003 | Kanamaru et al. | |
| 6,643,298 B1 | 11/2003 | Brunheroto et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,775,693 B1 | 8/2004 | Adams | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,157 B1 | 3/2005 | Scott et al. | |
| 6,888,831 B1 | 5/2005 | Hospodor et al. | |
| 6,901,072 B1 | 5/2005 | Wong | |
| 6,904,507 B2 | 6/2005 | Gil | |
| 6,922,408 B2 | 7/2005 | Bloch et al. | |
| 6,928,470 B1 | 8/2005 | Hamlin | |
| 6,934,799 B2 | 8/2005 | Acharya et al. | |
| 6,941,357 B2 | 9/2005 | Nguyen et al. | |
| 6,941,482 B2 | 9/2005 | Strong | |
| 6,947,393 B2 | 9/2005 | Hooper, III | |
| 6,952,659 B2 | 10/2005 | King et al. | |
| 6,968,463 B2 * | 11/2005 | Pherson et al. | 726/3 |

| Patent/Publication | Date | Inventor |
|---|---|---|
| 6,987,768 B1 | 1/2006 | Kojima et al. |
| 6,988,130 B2 | 1/2006 | Blumenau et al. |
| 6,988,149 B2 | 1/2006 | Odenwald |
| 7,000,025 B1 | 2/2006 | Wilson |
| 7,002,926 B1 | 2/2006 | Eneboe et al. |
| 7,010,607 B1 | 3/2006 | Bunton |
| 7,024,410 B2 | 4/2006 | Ito et al. |
| 7,039,070 B2 | 5/2006 | Kawakatsu |
| 7,039,870 B2 * | 5/2006 | Takaoka et al. ............. 715/736 |
| 7,047,326 B1 | 5/2006 | Crosbie et al. |
| 7,050,392 B2 | 5/2006 | Valdevit |
| 7,051,182 B2 | 5/2006 | Blumenau et al. |
| 7,055,068 B2 | 5/2006 | Riedl |
| 7,061,862 B2 | 6/2006 | Horiguchi et al. |
| 7,061,871 B2 | 6/2006 | Sheldon et al. |
| 7,076,569 B1 | 7/2006 | Bailey et al. |
| 7,092,374 B1 | 8/2006 | Gubbi |
| 7,110,394 B1 | 9/2006 | Chamdani et al. |
| 7,120,728 B2 | 10/2006 | Krakirian et al. |
| 7,123,306 B1 | 10/2006 | Goto et al. |
| 7,124,169 B2 | 10/2006 | Shimozono et al. |
| 7,150,021 B1 | 12/2006 | Vajjhala et al. |
| 7,151,778 B2 * | 12/2006 | Zhu et al. .................. 370/422 |
| 7,171,050 B2 | 1/2007 | Kim |
| 7,185,062 B2 | 2/2007 | Lolayekar et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,194,538 B1 * | 3/2007 | Rabe et al. .................. 709/224 |
| 7,200,108 B2 | 4/2007 | Beer et al. |
| 7,200,610 B1 | 4/2007 | Prawdiuk et al. |
| 7,209,478 B2 | 4/2007 | Rojas et al. |
| 7,215,680 B2 | 5/2007 | Mullendore et al. |
| 7,221,650 B1 | 5/2007 | Cooper et al. |
| 7,230,929 B2 | 6/2007 | Betker et al. |
| 7,233,985 B2 | 6/2007 | Hahn et al. |
| 7,245,613 B1 | 7/2007 | Winkles et al. |
| 7,248,580 B2 * | 7/2007 | George et al. ............... 370/389 |
| 7,263,593 B2 | 8/2007 | Honda et al. |
| 7,266,286 B2 * | 9/2007 | Tanizawa et al. ............. 386/52 |
| 7,269,131 B2 | 9/2007 | Cashman et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 2001/0011357 A1 | 8/2001 | Mori |
| 2001/0022823 A1 | 9/2001 | Renaud |
| 2001/0033552 A1 | 10/2001 | Barrack et al. |
| 2001/0038628 A1 | 11/2001 | Ofek et al. ................. 370/392 |
| 2001/0043564 A1 | 11/2001 | Bloch et al. |
| 2001/0047460 A1 | 11/2001 | Kobayashi et al. |
| 2002/0016838 A1 | 2/2002 | Geluc et al. |
| 2002/0034178 A1 | 3/2002 | Schmidt et al. |
| 2002/0071387 A1 | 6/2002 | Horiguchi et al. |
| 2002/0103913 A1 | 8/2002 | Tawil et al. |
| 2002/0104039 A1 | 8/2002 | DeRolf et al. |
| 2002/0122428 A1 | 9/2002 | Fan et al. |
| 2002/0124124 A1 | 9/2002 | Matsumoto et al. |
| 2002/0147560 A1 | 10/2002 | Devins et al. |
| 2002/0147843 A1 | 10/2002 | Rao |
| 2002/0156918 A1 | 10/2002 | Valdevit et al. |
| 2002/0159385 A1 | 10/2002 | Susnow et al. |
| 2002/0172195 A1 | 11/2002 | Pekkala et al. |
| 2002/0174197 A1 | 11/2002 | Schimke et al. |
| 2002/0191602 A1 | 12/2002 | Woodring et al. |
| 2002/0194294 A1 | 12/2002 | Blumenau et al. |
| 2002/0196773 A1 | 12/2002 | Berman |
| 2003/0002503 A1 | 1/2003 | Brewer et al. |
| 2003/0016683 A1 | 1/2003 | George et al. |
| 2003/0021239 A1 | 1/2003 | Mullendore et al. |
| 2003/0026267 A1 | 2/2003 | Oberman et al. |
| 2003/0026287 A1 | 2/2003 | Mullendore et al. |
| 2003/0033487 A1 | 2/2003 | Pfister et al. |
| 2003/0035433 A1 | 2/2003 | Craddock et al. |
| 2003/0046396 A1 | 3/2003 | Richter et al. |
| 2003/0056000 A1 | 3/2003 | Mullendore et al. |
| 2003/0072316 A1 | 4/2003 | Niu et al. |
| 2003/0076788 A1 | 4/2003 | Grabauskas et al. |
| 2003/0079019 A1 | 4/2003 | Lolayekar et al. |
| 2003/0084219 A1 | 5/2003 | Yao et al. |
| 2003/0086377 A1 | 5/2003 | Berman |
| 2003/0091062 A1 | 5/2003 | Lay et al. |
| 2003/0093607 A1 | 5/2003 | Main et al. |
| 2003/0103451 A1 | 6/2003 | Lutgen et al. |
| 2003/0115355 A1 | 6/2003 | Cometto et al. |
| 2003/0117961 A1 | 6/2003 | Chuah et al. |
| 2003/0118053 A1 | 6/2003 | Edsall et al. |
| 2003/0120743 A1 | 6/2003 | Coatney et al. |
| 2003/0120983 A1 | 6/2003 | Vieregge et al. |
| 2003/0126223 A1 | 7/2003 | Jenne et al. |
| 2003/0126242 A1 | 7/2003 | Chang |
| 2003/0126320 A1 | 7/2003 | Liu et al. |
| 2003/0131105 A1 | 7/2003 | Czeiger et al. |
| 2003/0137941 A1 | 7/2003 | Kaushik et al. |
| 2003/0139900 A1 | 7/2003 | Robison |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0174789 A1 * | 9/2003 | Waschura et al. ........... 375/340 |
| 2003/0179709 A1 | 9/2003 | Huff |
| 2003/0179748 A1 | 9/2003 | George et al. ............... 370/389 |
| 2003/0179755 A1 | 9/2003 | Fraser |
| 2003/0189930 A1 | 10/2003 | Terrell et al. |
| 2003/0189935 A1 | 10/2003 | Warden et al. |
| 2003/0191857 A1 | 10/2003 | Terell et al. |
| 2003/0195983 A1 | 10/2003 | Krause |
| 2003/0198238 A1 | 10/2003 | Westby |
| 2003/0218986 A1 | 11/2003 | DeSanti et al. |
| 2003/0229808 A1 | 12/2003 | Heintz et al. |
| 2003/0236953 A1 | 12/2003 | Grieff et al. |
| 2004/0013088 A1 | 1/2004 | Gregg |
| 2004/0013092 A1 | 1/2004 | Betker et al. |
| 2004/0013113 A1 | 1/2004 | Singh et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0054776 A1 | 3/2004 | Klotz et al. |
| 2004/0054866 A1 | 3/2004 | Blumenau et al. |
| 2004/0057389 A1 | 3/2004 | Klotz et al. |
| 2004/0064664 A1 | 4/2004 | Gil |
| 2004/0081186 A1 * | 4/2004 | Warren et al. ............... 370/419 |
| 2004/0081196 A1 | 4/2004 | Elliott |
| 2004/0081394 A1 | 4/2004 | Biren et al. |
| 2004/0085955 A1 | 5/2004 | Walter et al. |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ....................... 370/463 |
| 2004/0151188 A1 | 8/2004 | Maveli et al. |
| 2004/0153526 A1 | 8/2004 | Haun et al. |
| 2004/0153914 A1 | 8/2004 | El-Batal |
| 2004/0174813 A1 | 9/2004 | Kasper et al. |
| 2004/0202189 A1 | 10/2004 | Arndt et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |

| | | | |
|---|---|---|---|
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0034302 A1 | 2/2006 | Peterson |
| 2006/0047852 A1 | 3/2006 | Shah et al. |
| 2006/0074927 A1 | 4/2006 | Sullivan et al. |
| 2006/0107260 A1 | 5/2006 | Motta |
| 2006/0143300 A1 | 6/2006 | See et al. |
| 2006/0184711 A1 | 8/2006 | Pettey |
| 2006/0203725 A1 | 9/2006 | Paul et al. |
| 2006/0274744 A1 | 12/2006 | Nagai et al. |
| 2007/0206502 A1 | 9/2007 | Martin et al. |

FOREIGN PATENT DOCUMENTS

| | | |
|---|---|---|
| EP | 0856969 | 1/1998 |
| EP | 1059588 | 12/2000 |
| WO | WO-98/36537 | 8/1998 |
| WO | WO 01/95566 A2 * | 12/2001 |
| WO | WO03/088050 | 10/2003 |

OTHER PUBLICATIONS

"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Office Action from USPTO dated Mar. 5, 2008 for U.S. Appl. No. 10/889,259".
"Office Action from USPTO dated Mar. 7, 2008 for U.S. Appl. No. 10/894,629".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Final Office Action from USPTO dated Apr. 29, 2008 for U.S. Appl. No. 10/894,491".
"Office Action from USPTO dated May 2, 2008 for U.S. Appl. No. 11/037,922".
"Office Action from USPTO dated May 14, 2008 for U.S. Appl. No. 10/956,502".
"Office Action from USPTO dated May 15, 2008 for U.S. Appl. No. 10/798,527".
"Office Action from USPTO dated Sep. 18, 2008 for U.S. Appl. No. 10/894,978".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
Brown, Douglas W., "A State-Machine Synthesizer", *18th Design Automation Conference*, (1981),301-305.
Curtis, A. R., "Design Considerations for 10-Gbit Fibre Channel", *Curtis A. Ridgeway, Distinguished I/O Architect, Storage and Computing ASIC's Division, LSI Logic Corp.*, Apr. 14, 2003.
Malavalli, Kumar , "High Speed Fibre Channel Switching Fabric Services", *Proceedings of the SPIE, SPIE, Bellingham, VA, USA vol. 1577,, XP000562869, ISSN: 0277-786X,*(Sep. 4, 1991),216-226.
Ridgeway, Curt , "OGFC-40GFC using 4-lane XAUI's ", *LSI Logic Presentation—T11/03-069v0*, Feb. 3, 2003.
Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support" ; VF Switch Support, T11/04-395v2. Sep. 2004, pp. 1-15.
Pelissier et al, "Inter-Fabric Routing" , dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
Naik, D. "Inside Windows Storage:Server Storage Technologies for Windows 2000, Windows Server 2003 and Beyond", *Addison-Wesley, US, Chapter 5, XP-002381152*, (Jul. 15, 2003),137-173.

"Deliver Server-Free Backup", *Pathlight & Computer Associates*, White Paper of Apr. 2000, Ithaca, New York, XP-002381153,1-8.

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Office Action from USPTO dated Aug. 20, 2007 for U.S. Appl. No. 10/302,149".

"Office Action from USPTO dated Jul. 3, 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Sep. 6, 2007 for U.S. Appl. No. 10/889,337".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Examination Report from the European Patent Office dated Oct. 12, 2007 for European Application No. 05 805 632.6".

Malavalli, et al., "Fibre Channel Framing and Signaling (FC-FS) REV 1.10", *NCITS working draft proposed American National Standard for Information Technology*, (Jan. 25, 2001).

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Jun. 28, 2007 for U.S. Appl. No. 10/894,529".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 16, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

Banks, David C., et al., "Link Trunking and Measuring Link Latency in Fibre Channel Fabric", U.S. Appl. No. 60/286,046, 1-52, Apr. 23, 2001.

\* cited by examiner

LUN BASED HARD ZONING IN FIBRE CHANNEL SWITCHES

CROSS REFERENCE TO RELATED APPLICATIONS

This application claims priority under 35 U.S.C. § 119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches;

Filed on Aug. 14, 2003, Ser. No. 60/495,212, entitled "Method and System for Detecting Congestion and Over Subscription in a Fibre channel Network"

Filed on Aug. 14, 2003, Ser. No. 60/495,165, entitled "LUN Based Hard Zoning in Fibre Channel Switches";

Filed on Sep. 19, 2003, Ser. No. 60/503,809, entitled "Multi Speed Cut Through Operation in Fibre Channel Switches"

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane"

Filed on Dec. 29, 2003, Ser. No. 60/532,966, entitled "Method And System For Using Extended Fabric Features With Fibre Channel Switch Elements"

Filed on Mar. 4, 2004, Ser. No. 60/550,250, entitled "Method And System for Programmable Data Dependent Network Routing"

Filed on May 7, 2004, Ser. No. 60/569,436, entitled "Method And System For Congestion Control In A Fibre Channel Switch"

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly to LUN based hard zoning in fibre channel switches.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre Channel allows the use of Small Computer System Interface ("SCSI") protocol in storage area networks. SCSI storage devices are sub-divided into multiple Logical Unit Numbers (LUNs).

In Fibre Channel Fabrics, zoning is used to control access of devices attached to the Fabric to other devices. Hard Zoning is zoning that is enforced on individual frames sent from one end-user device to another end-user device by preventing delivery of frames across zone boundaries.

Conventional techniques and standards do not allow secure LUN based zoning for fibre channel switches. Hence, this can result in inadvertent or malicious access by a device(s) that are not supposed to use a particular LUN.

Therefore, what is required is a process and system that can enforce secure; LUN based hard zoning for fibre channel switches.

SUMMARY OF THE PRESENT INVENTION

In one aspect of the present invention, a method for implementing LUN based hard zoning in a fibre channel network is provided. The method includes, comparing a LUN field in a Fibre Channel SCSI command frame with a list of LUNS that are allowed for a particular frame source; and forwarding the frame if the LUN is allowed for the frame source. The comparison is performed by a port receiving the frame by using an address look up table ("ALUT").

In yet another aspect of the present invention, a method for processing a reply to a SCSI REPORT LUN command from an initiator is provided. The method includes, intercepting a reply to a REPORT LUN command; editing the reply to remove unauthorized LUNs; and sending the edited reply to the initiator. An alias cache is set up to identify a reply to a SCSI REPORT LUN command and route the reply to a processor if a target for the REPORT LUN command is using LUN zoning.

In yet another aspect of the present invention, a Fibre Channel switch element for implementing LUN based hard zoning is provided. The switch element includes, means for comparing a LUN field in a Fibre Channel SCSI command frame with a list of LUNS that are allowed for a particular frame source; and means for forwarding the frame if the LUN is allowed for the frame source. A port receiving the frame by using an ALUT performs the comparison.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
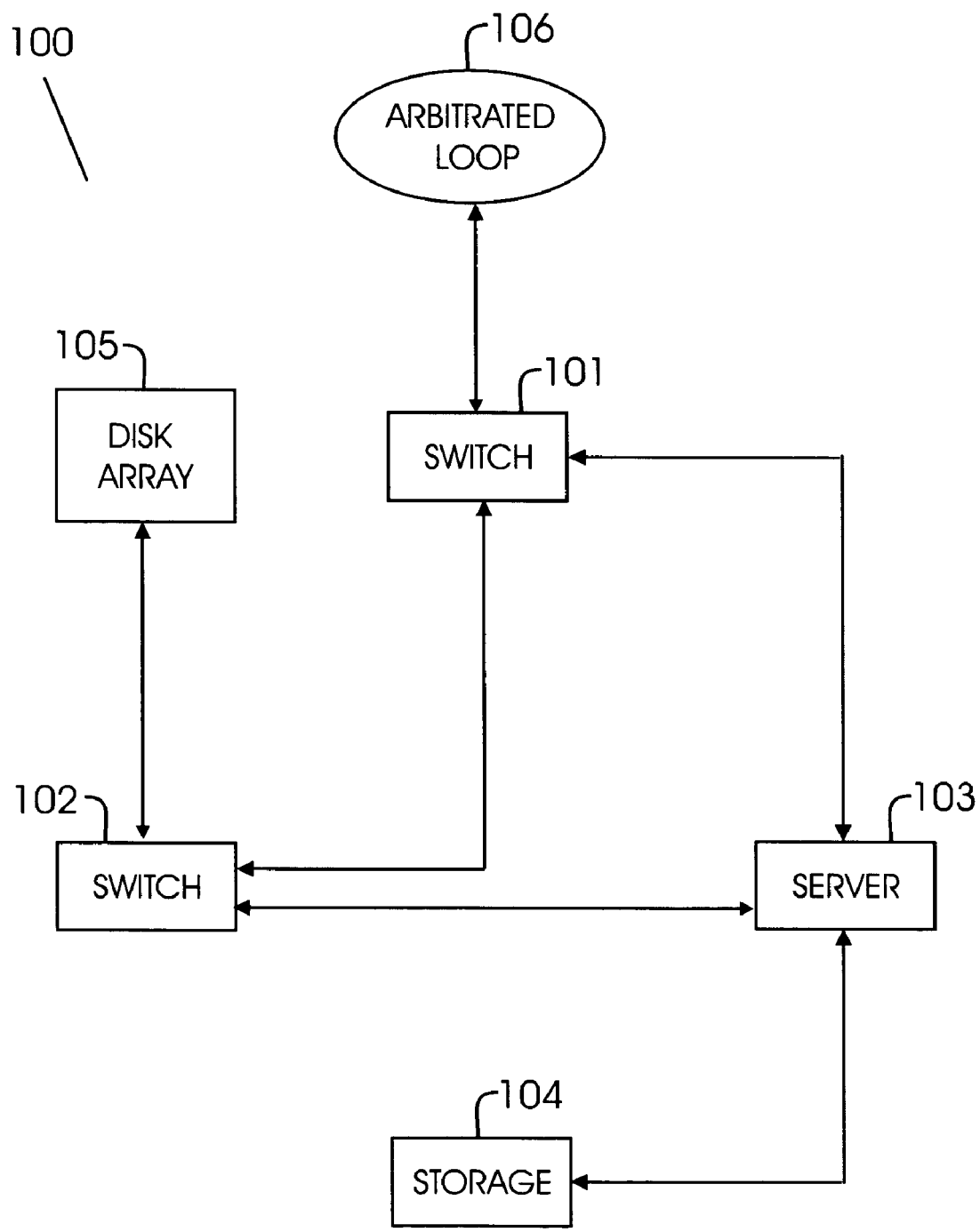
FIG. 1A shows an example of a Fibre Channel network system.

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FC-FS": Fibre channel standard (incorporated herein by reference in its entirety) for framing and signaling, which includes frame structure, basic link maintenance and login, and sequence and exchange operation, incorporated herein by reference in its entirety.

"FC-FCP-2": Fibre Channel protocol for mapping SCSI to Fibre Channel.

"FCP_CMND": Fibre Channel frame defined in FC-FCP-2 standard that carries SCSI commands.

"FCP_DATA": Fibre Channel frame defined in FC-FCP-2 standard (incorporated herein by reference in its entirety) that carries SCSI data. "FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

"Port": A general reference to N. Sub.—Port or F. Sub.—Port.

"L_Port": A port that contains Arbitrated Loop functions associated with the Arbitrated Loop topology.

"LUN": Logical Unit Number that identifies a sub-unit within a SCSI device (per the SAM-2 standard, incorporated herein by reference in its entirety).

"N-Port": A direct fabric attached port.

"NL_Port": A L_Port that can perform the function of a N_Port.

"R_CTL" An 8 bit Fibre Channel frame header field that identifies the type of frame (per the FC-FS standard).

"SAM-2"—The standard for SCSI Architecture Model 2, incorporated herein by reference in its entirety.

"SCSI": Small Computer Systems Interface.

"S_ID": Fibre Channel frame header field containing the source address (per the FC-FS standard).

"SCSI initiator": A SCSI device that initiates a SCSI input/output ("I/O") operation.

"SPC-2": Standard for SCSI Primary Commands incorporated herein by reference in its entirety.

"SCSI target": A SCSI device that responds to I/O operations from a SCSI initiator and typically is a storage device.

"Switch": A fabric element conforming to the Fibre Channel Switch standards.

In one aspect of the present invention, hard zoning is extended to SCSI LUNs so that a SCSI initiator can access some LUNs associated with a particular Fibre Channel port, but is denied access to others. A method is also provided for fibre channel switch to intercept and edit "SCSI REPORT LUNS" command so that SCSI initiators do not try to access LUNs that they are not allowed to use, hence, avoiding extra error reporting.

In another aspect of the present invention, by implementing LUN based hard zoning on a Fibre Channel switch allows secure access to individual LUNs on SCSI devices by preventing inadvertent or malicious access by devices that are not supposed to use a particular LUN.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
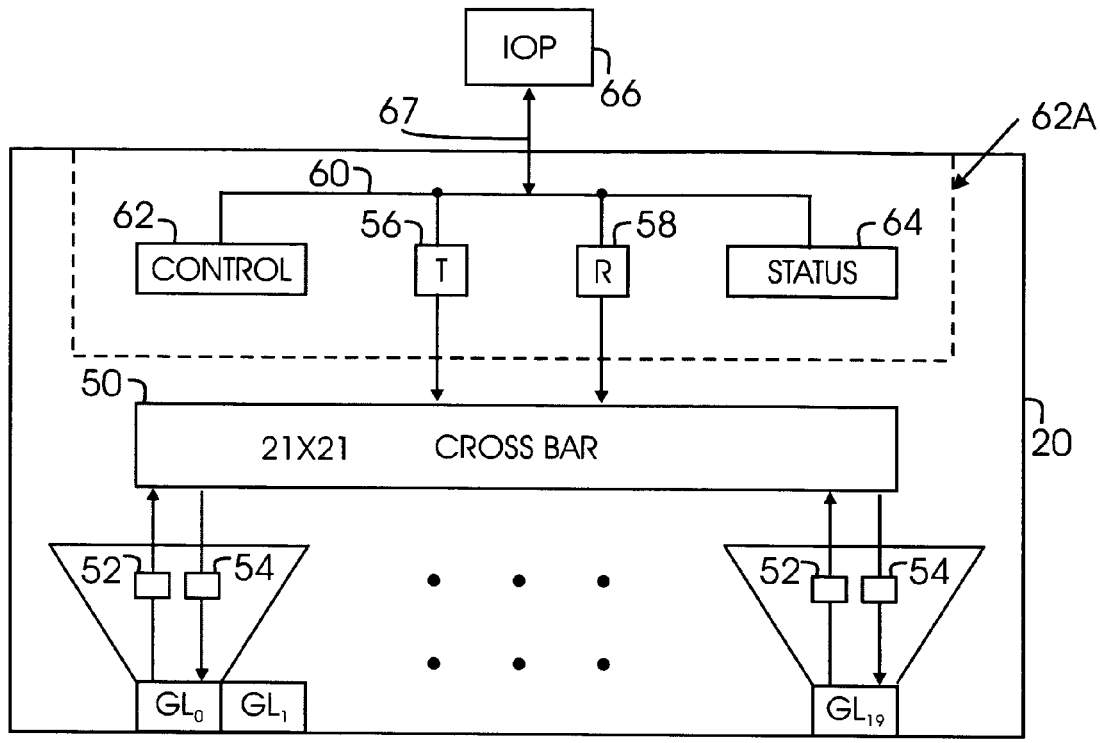
FIG. 1B shows an example of a Fibre Channel switch element, according to one aspect of the present invention.

FIG. 1B is a block diagram of a 20-port ASIC ("Application Specific Integrated Circuit") fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each generic port (also referred to as GL Ports) can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
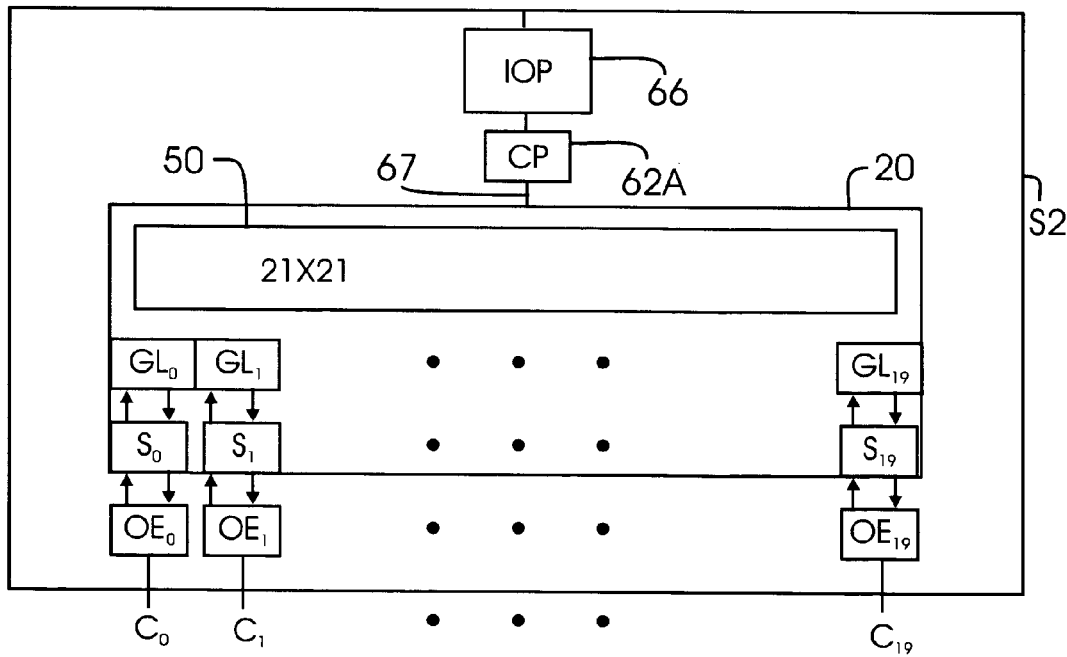
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56 (also referred to as "T"), receive buffer 58 (also referred to as "R"), control register 62 and Status register 64 connect to bus 60. Transmit buffer 56 and receiver buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL ports correspond to channel (also referred to as "C") C0-C19. Each GL port has a serial/deserializer (SERDES) (also referred to as "S") designated as S0-S19. Ideally, the SERDES functions are implemented on ASIC 20 for efficiency, but may alternatively be external to each GL port.

Each GL port has an optical-electric converter (also referred to as "OE"). designated as OE0-OE19 connected switch its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
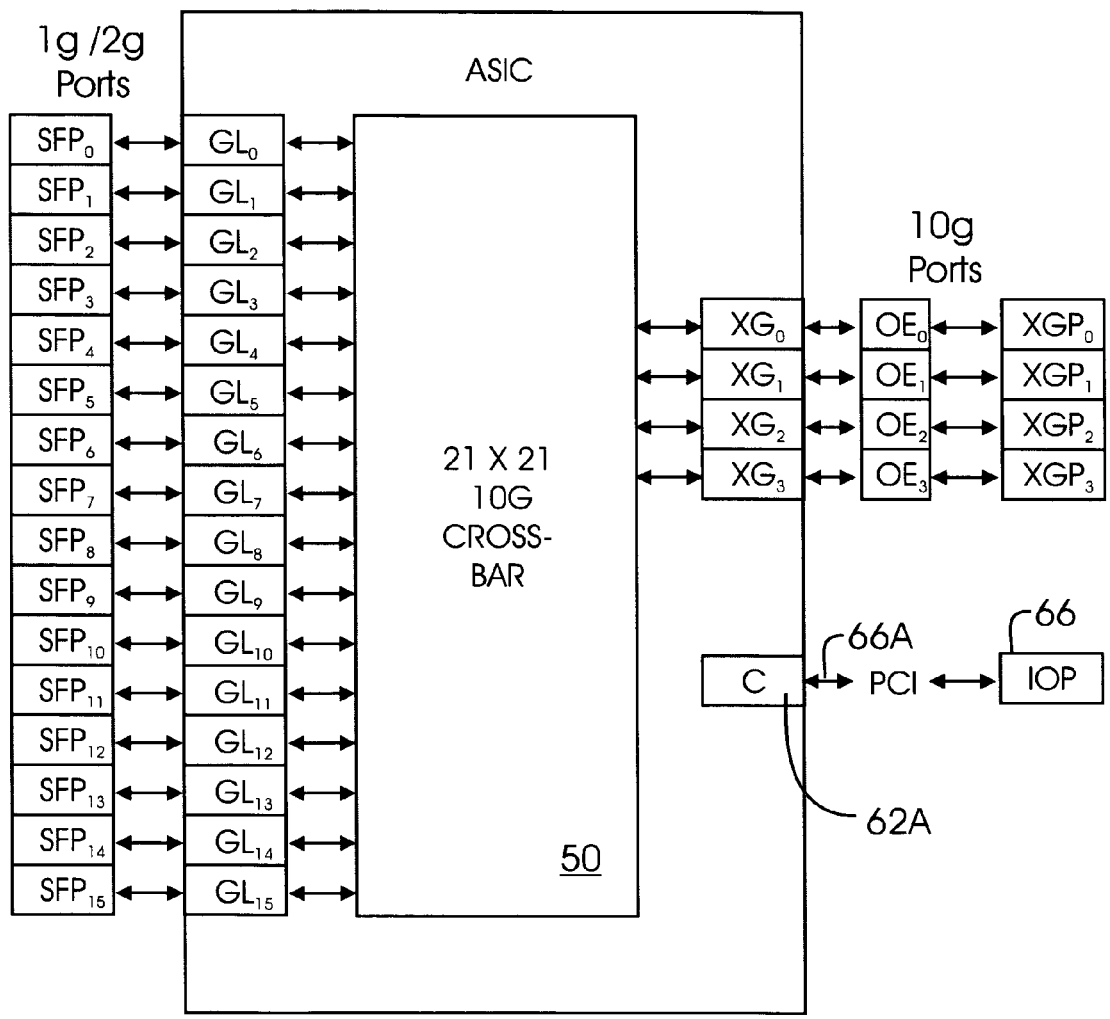
FIG. 1D shows a block diagram of a Fibre Channel switch element with sixteen GL_Ports and four 10 G ports, according to one aspect of the present invention.
Figure 2A:
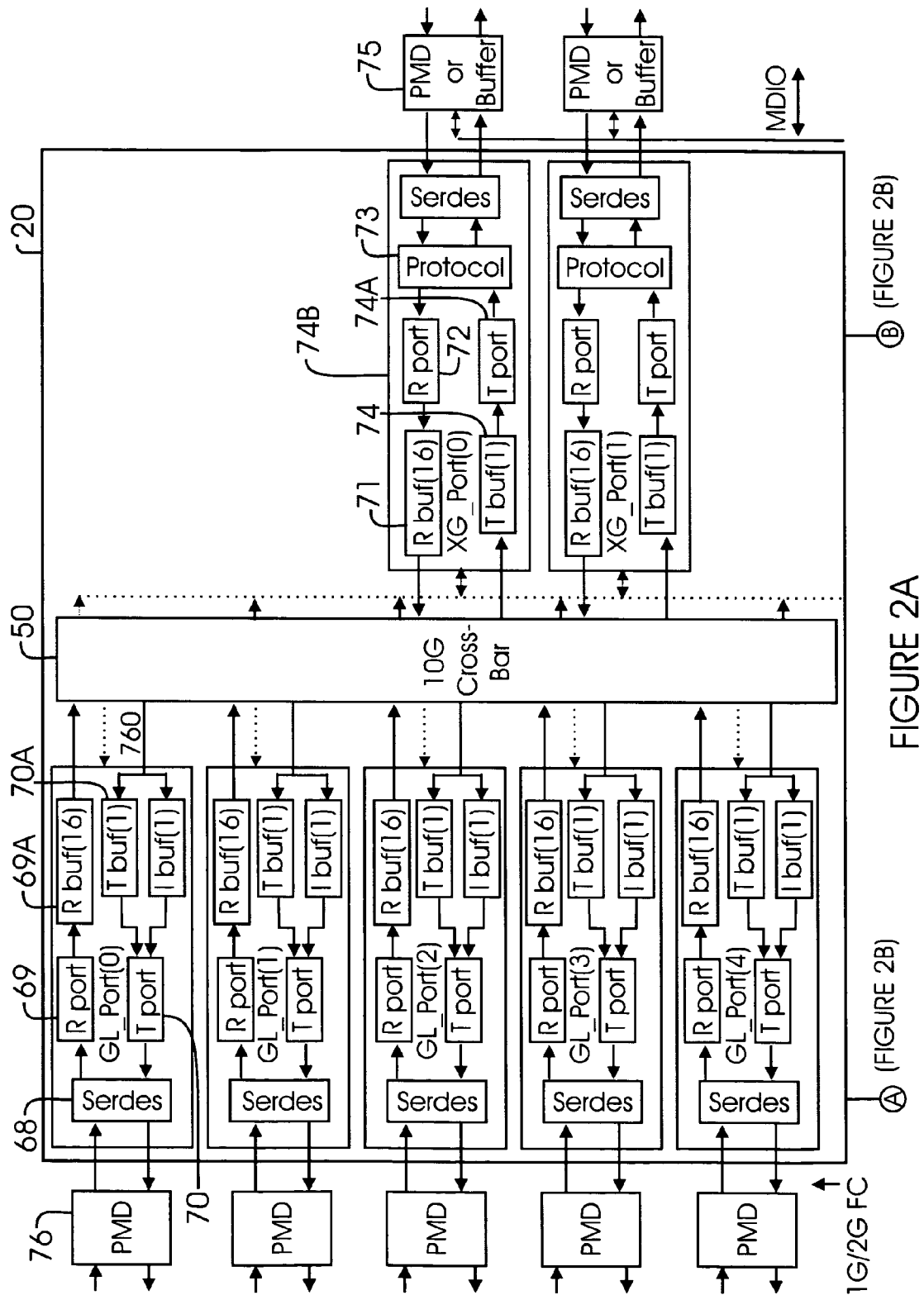
FIGS. 2A-2B (jointly referred to as FIG. 2) show another block diagram of a Fibre Channel switch element with sixteen GL_Ports and four 10 G ports, according to one aspect of the present invention.
Figure 2B:
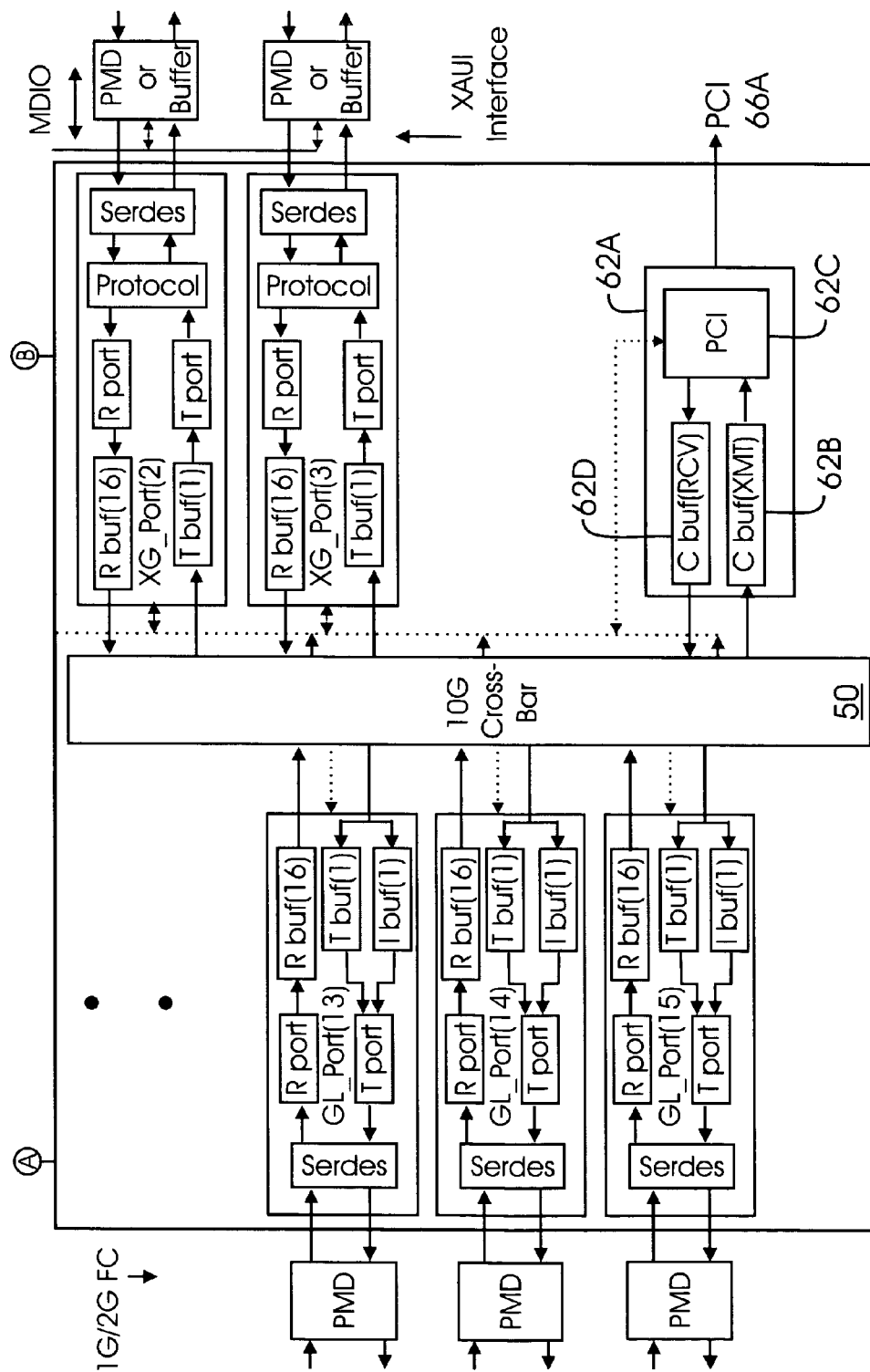

FIG. 1D shows a block diagram of ASIC 20 with sixteen GL ports and four 10 G (Gigabyte) port control modules designated as $XG_0$-$XG_3$ for four 10 G ports designated as XGP0-XGP3. GL ports $GL_0$-$GL_{15}$) communicate with 1 g/2 g SFP Port modules $SFP_0$-$SFP_{15}$. SFP is a small form factor pluggable optical transceiver. ASIC 20 include a control port 62A (also referred to as "CP") that is coupled to IOP 66 through a peripheral component interconnect "PCI" connection 66A.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
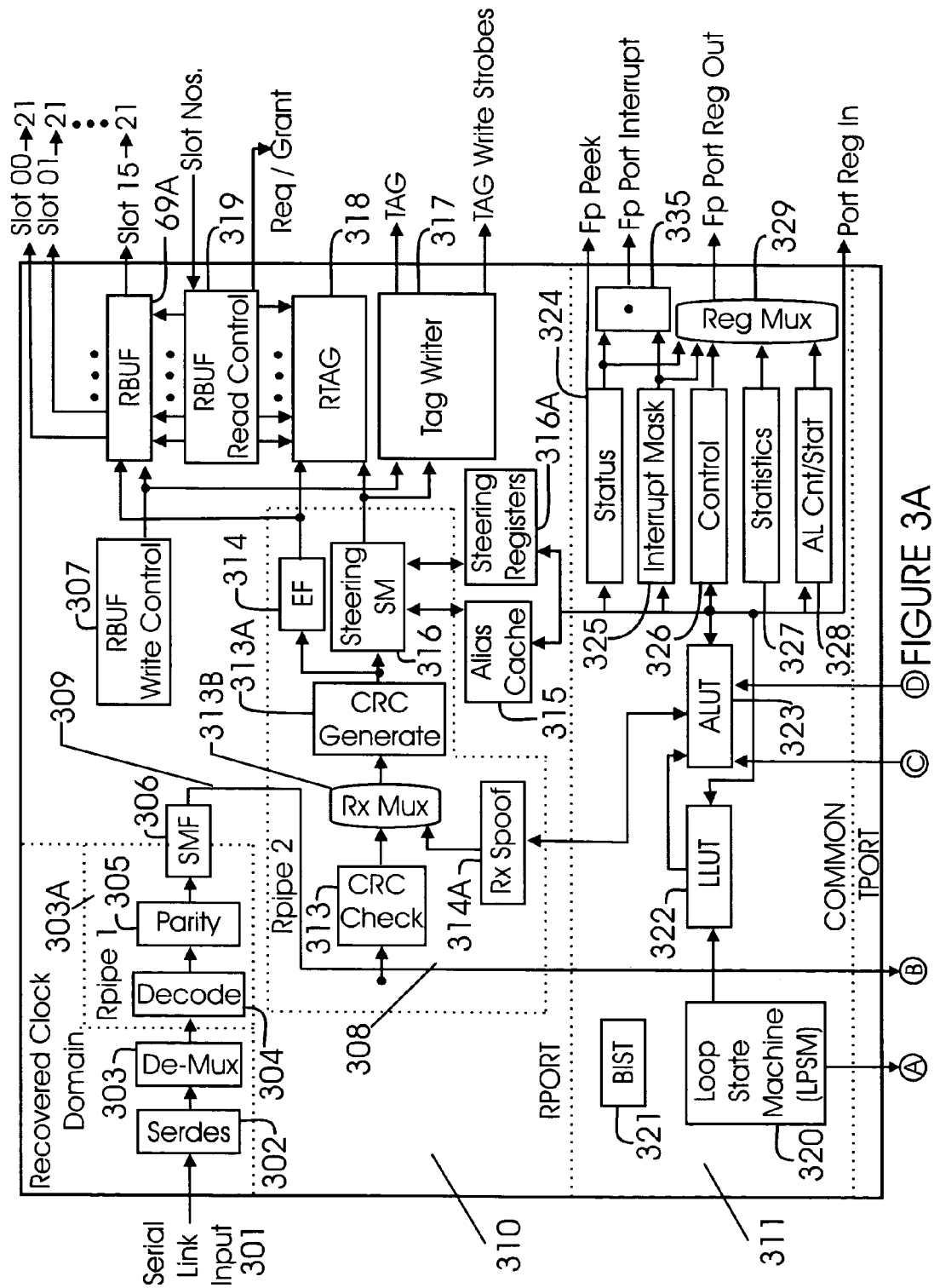
FIGS. 3A/3B (jointly referred to as FIG. 3) show a block diagram of a GL_Port, according to one aspect of the present invention.
Figure 3B:
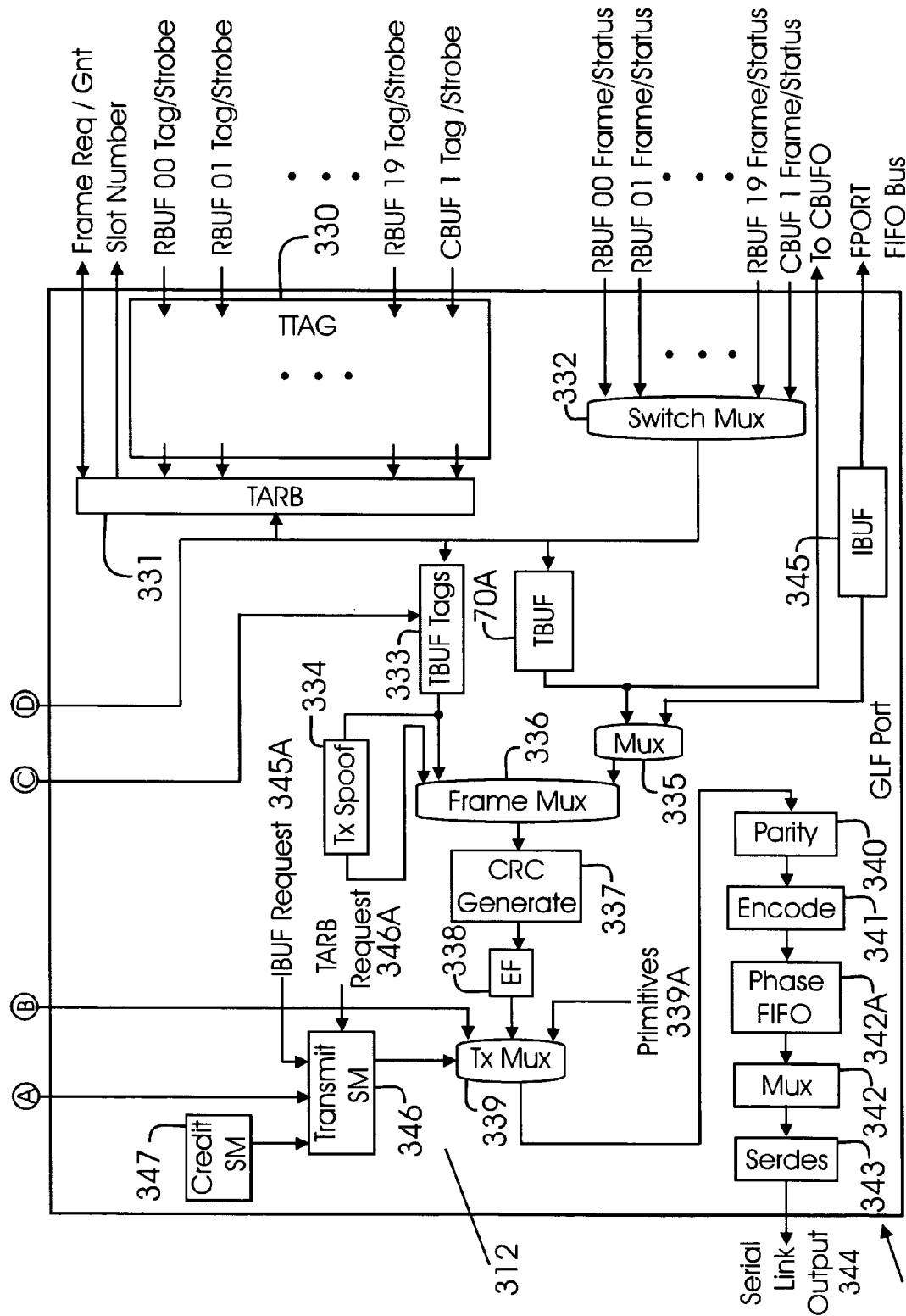

GL Port:

FIGS. 3A-3B (referred to as FIG. 3) show a detailed block diagram of a GL port as used in ASIC 20. GL port 300 (also referred to as GLF Port) is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter GL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. RWT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8 B codes. Mux 313B receives input from Rx Spoof module 314A, which encodes frames to a proprietary format (if enabled). RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM or Steering SM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (RTAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARB 331 then reads the tag. For any given source, there are as many entries in TTAG 330 as there are credits in RBUF 69A.

TARB 331 is activated anytime there are one or more valid frame tags in TTAG 330. TARB 331 preconditions its controls for a frame and then waits for the frame to be written into TBUF 70A. After the transfer is complete, TARB 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Frame Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8 B codes and CRC module 337 generates CRC data for the outgoing frames.

Modules 340-343 put a selected transmission source into proper format for transmission on an output link 344. Parity 340 checks for parity errors, when frames are encoded from 8 B to 10 B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Port:

As discussed above, ASIC 20 include common segment 311 comprising of various modules. LPSM 320 has been described above and controls the general behavior of TPORT 312 and RPORT 310.

A loop look up table ("LLUT") 322 and an address look up table system ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
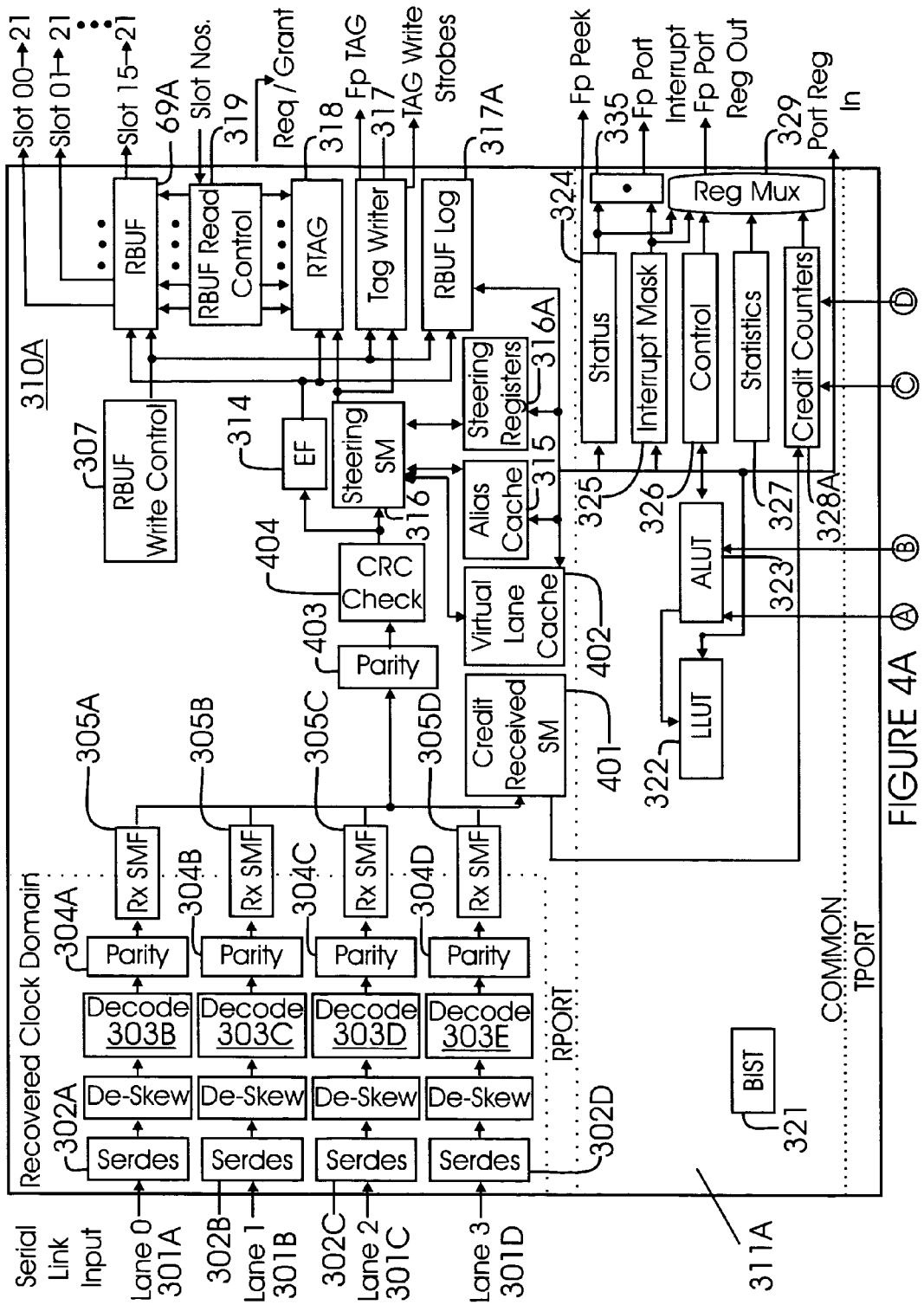
FIGS. 4A/4B (jointly referred to as FIG. 3) show a block diagram of XG_Port (10 G) port, according to one aspect of the present invention.
Figure 4B:
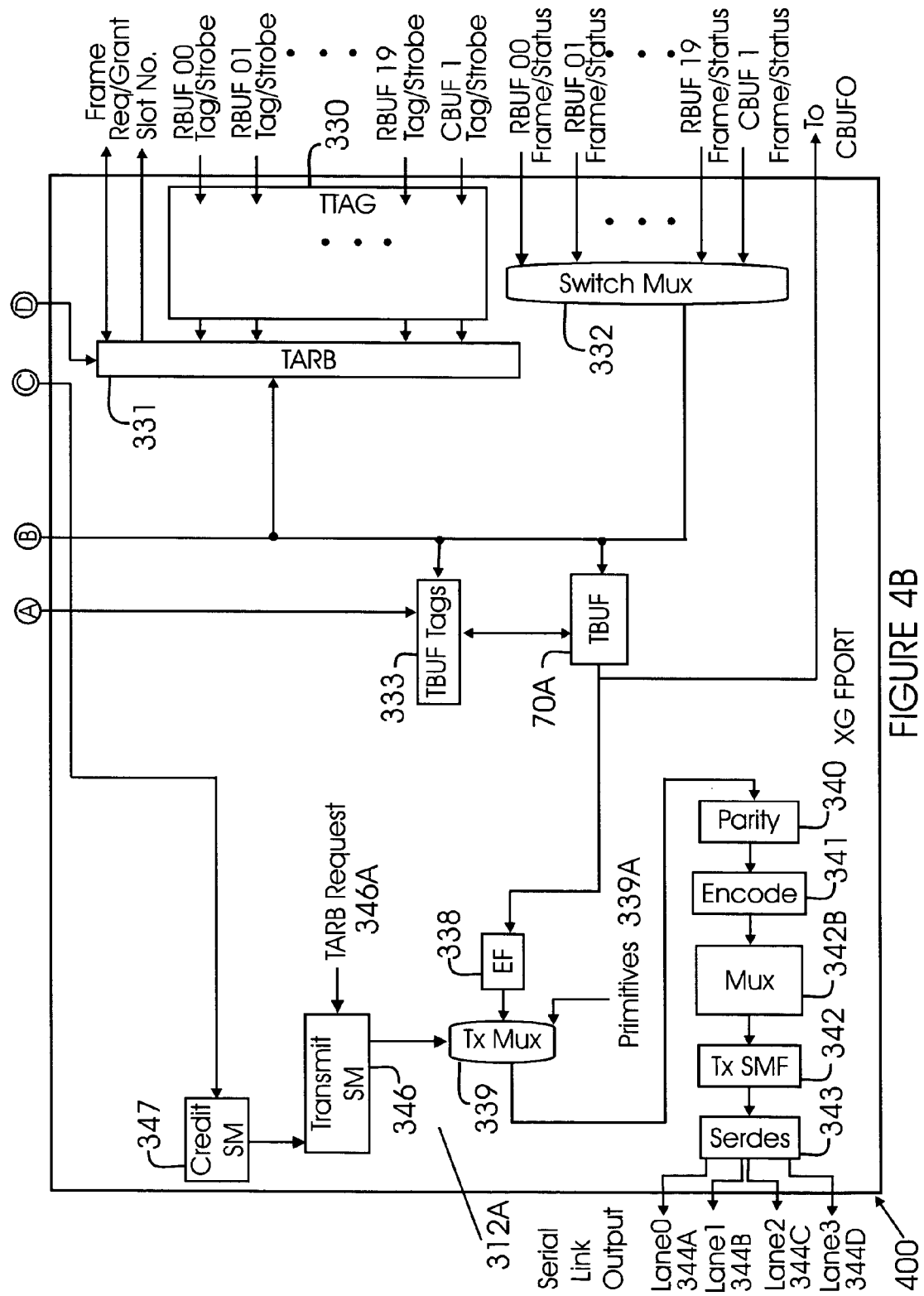

FIGS. 4A-4B (referred to as FIG. 4) show a block diagram of a 10 G Fibre Channel port control module (XG FPORT) 400 used in ASIC 20. Various components of XG FPORT 400 are similar to GL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing ("TxSMF") module 342 that handles clock variation on the transmit side. SERDES 343 then sends the data out to the link.

LUN Based Hard Zoning:

In one aspect of the present invention, filtering FCP_CMND messages enforces LUN based hard zoning. A Fibre Channel switch port checks the LUN field in the payload of a FCP_CMND Fibre Channel frame against a list of LUNs that are allowed for a particular source of the frame. This hard zoning is enforced on a frame-by-frame basis. The switch port attached to the destination of the frame performs the check. FCP_CMND frames are forwarded to the attached port only if the LUN in the frame is an allowed LUN for that source port. Hence, unauthorized SCSI initiator ports are unable to perform any SCSI based operations with the zoned target port because the FCP_CMND messages are filtered.

Fiber Channel header fields identify FCP_CMND frames as follows:

"Type"—SCSI frames have the "Type" field equal to 8 per the FC_FS standard.

"R_CTL": The upper 4 bits of this field are 0 (Device Data frame) and the lower 4 bits are 6 (which indicates that it is an "Unsolicited Command", per the FC-FS and FC-FCP-2 standard.

Figure 5A:
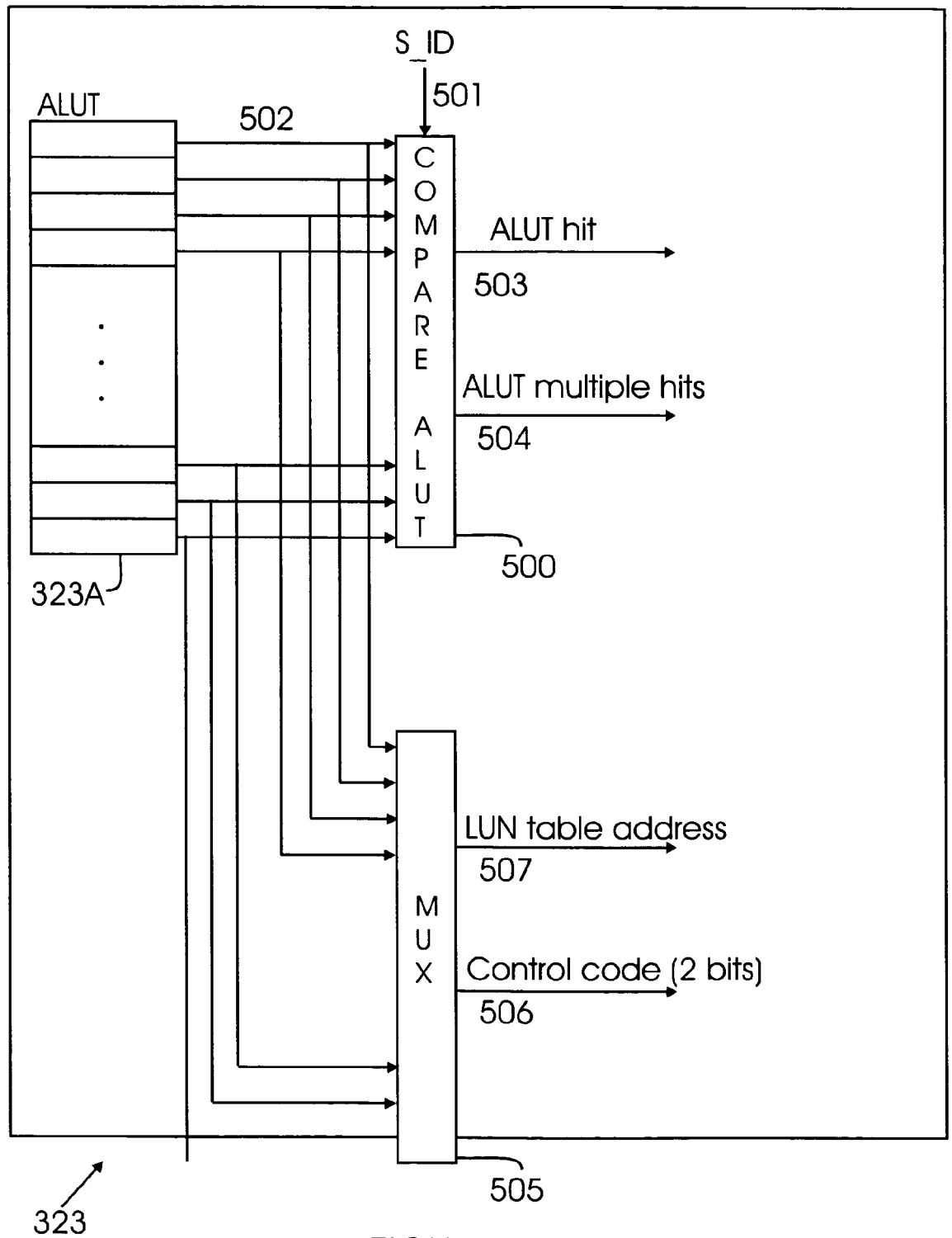
FIGS. 5A-5B (collectively referred to herein as FIG. 5), show a system according to one aspect of the present invention for LUN based hard zoning.
Figure 5B:
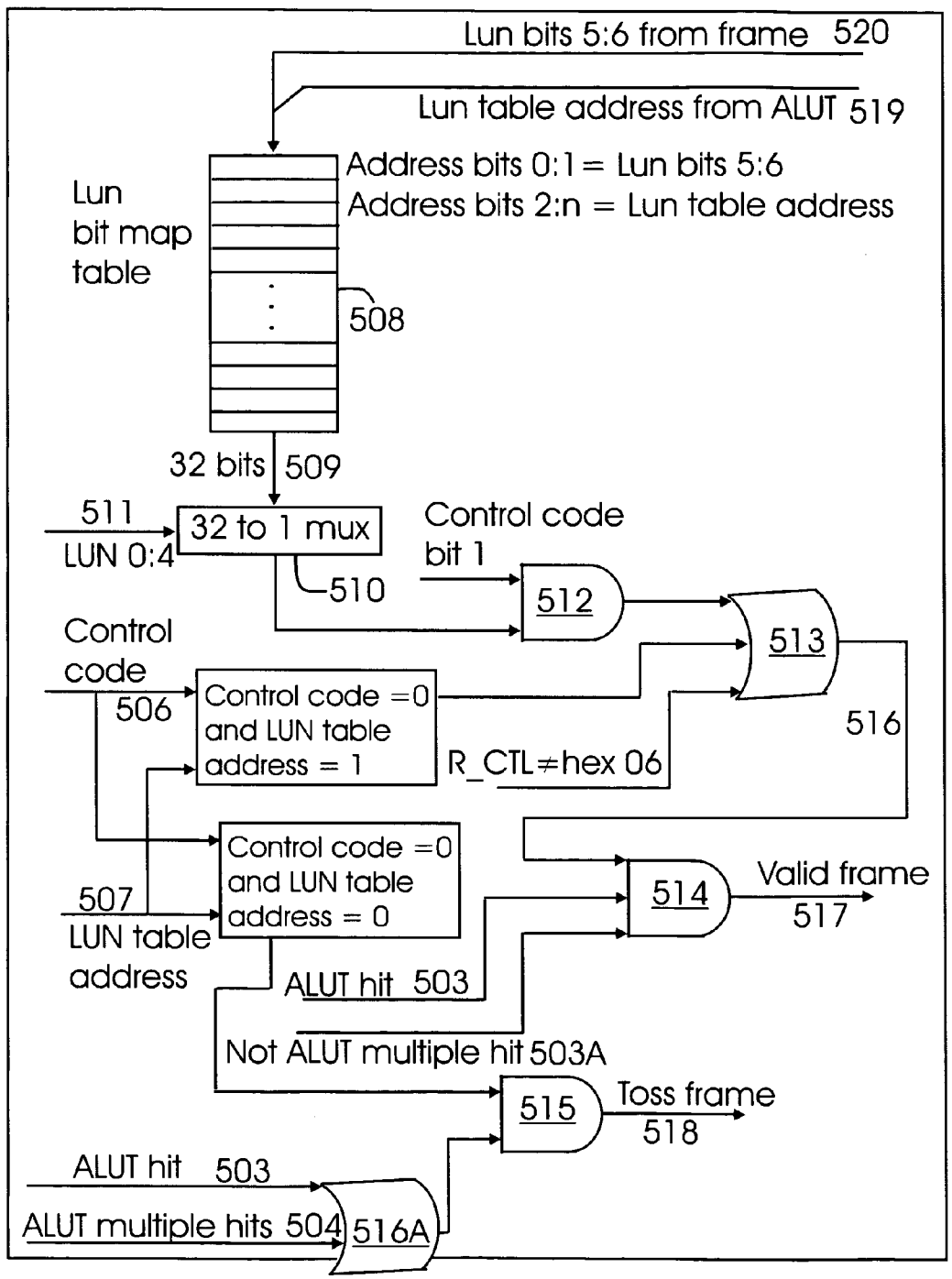

FIGS. 5A-5B (collectively referred to herein as FIG. 5) show system 323 according to one aspect of the present invention for LUN based hard zoning.

Each time an FC_CMND frame arrives from a switch port, the S_ID 501 is compared to ALUT 323A entries (502) by compare module 500. The compare process may be performed using associative memory hardware (not shown), or by any other lookup method, for example, hashing.

ALUT 323A and LUN bit table 508 values are used to check FCP_CMND frames. To illustrate the adaptive aspects of the present invention, the following fields are used to enforce LUN based hard zoning:

ALUT 323A Fields:

The following fields may be used for LUN zoning, according to one aspect of the present invention:

Domain: This is an 8-bit field that is compared with bits 16-23 of the S_ID 501, if enabled.

Area: This is an 8-bit field that is compared to the bits 8-15 of the frame S_ID 501, if enabled.

Port: This is an 8-bit field that is compared to bits 0-7 of the frame S_ID 501, if enabled.

A compare mask (a 2 bit field) controls how compare module 500 performs the comparison. The following bit values determine what values of S_ID 501 are compared with ALUT 323A entries.

0—ALUT entry is not valid, hence, not compared

1—Compare Domain, Area, and port entries with frame S_ID, Domain, Area and Port fields 2—Compare Domain and Area entries with frame S_ID Domain and Area fields 3—Compare only Domain entry with frame S_ID Domain field A Control Code 506 defines how LUN table address field 507 is interpreted. Control Code 506 may be a 2-bit field, defined as follows:

0—If compare matches, use LUN address field as control code, based on the following:

LUN address field =000, discard frame

LUN address field =001, do not check LUN (frame passes)

2—If compare matches, then LUN table address field is used to address the LUN bit map table (508).

LUN table address 507 is used to address a LUN table 508 entry, which contains a bit map that indicates which LUNs are acceptable. LUN table 508 is populated by LUN bit values from a frame and ALUT 323A, shown as 520 and 519, respectively in FIG. 5B. Each entry in LUN table 508 is a bit map where each bit corresponds to a particular LUN number. The total number of LUNs that are supported depends on the size of the bit map.

The size of the LUN bit map table 508 may be 128 bits, so bits 16-22 of the $1^{st}$ payload word is used as bits 0-6 of the LUN. With a 128-bit table, the maximum number of LUNs that can be zoned is 128.

If LUN bit map 508 is implemented as 32 bit words, then the address of the word is derived from bits 5-6 of the LUN field as the lower 2 bits of the address, and the LUN table address 507 from the matching ALUT 323A entry is derived as bits 2-n of the LUN bit map word address. Bits 0-4 of the LUN field (shown as 511, FIG. 5B) select one of the 32 bits in the word to check for a valid LUN (using Multiplexer ("Mux") 510).

In one aspect, a part of the 64 bit LUN field in the FCP_CMND frame may be limited to the first level LUN, which is located within bits 16-31 of the $1^{st}$ word of the FCP_CMND frame payload (per standard SAM-2). If 128 bits are used for LUN table 508 entries, then LUN values between 0 to 127 can be checked.

As shown in FIG. 5B, LUN table value 509 and LUN bit 0:4 are sent to gate 512 via Mux 510. Gate 512 receives the first bit of control code 506 and the output from Mux 510. The output of gate 512 is sent to gate 513 that receive two other inputs, a value based on if the control code 06 is equal to 0 and LUN table address 509 is equal to 1, and a value to showing if the R_CTL field is not equal to 1. Output 516 from gate 513 is sent to gate 514 that generates a valid frame 517 based on ALUT hit signal 503, signal 503A and output 516.

Gate 515 receives an input via gate 516A (that receives 503 and 504). Gate 515 also receives an input when the control code 506 is equal to 0 and LUN table address 509 is equal to 0. Based on the two inputs, gate 515 generates a "toss frame" signal 518.

It is noteworthy that the present invention is not limited to any particular logic layout, other logic combination may be used to implement the adaptive aspects of the present invention.

The following is the outcome of S_ID 501 comparison to ALUT 323A entries 502:

If no ALUT 323A entries match an FCP_CMND frame, the frame is rejected based on signal 518.

If multiple ALUT 323A entries match (504), the frame is rejected based on signal 518.

If there is an ALUT 323A match (503), and Control Code 506 is 0, and LUN table address field 507 is 0, then the frame is rejected (or tossed) based on signal 518.

If there is an ALUT 323A match (503), and Control Code 506 is 0, and the LUN table address field 507 is 1, then the frame is valid for all LUNs and is transmitted (shown as signal 517).

If there is an ALUT 323A match (503), and Control Code is 2, then LUN table address field 507 is used to address the LUN bit map. The LUN from the FCP_CMND payload word 0, bits 16-31 (number of bits used depends on size of bit map) is used to index bit map table 508.

If the bit is set, the frame is valid. If the bit is not set, the frame is rejected. If the frame is not an FCP_CMND and does not contain a LUN field then only the ALUT 323A match and Control Code 506 value equal to 2 is required for valid frame transmission.

If a frame is rejected, it could either be discarded or sent to IOP 66. A policy control code (described below) may be used to decide the disposition of frames rejected by LUN hard zoning. The switch in question may want to bring frames that fail LUN hard zoning to IOP 66 so that the switch can send an FCP_RESP with a "SCSI CHECK CONDITION" back to the initiator.

If a frame is valid, it is transmitted to the attached port. Since LUN 0 is valid for all SCSI devices, the bit for LUN 0 is most likely set for all LUN bit maps. This allows the "SCSI INQUIRY" command to be processed.

Figure 7A:
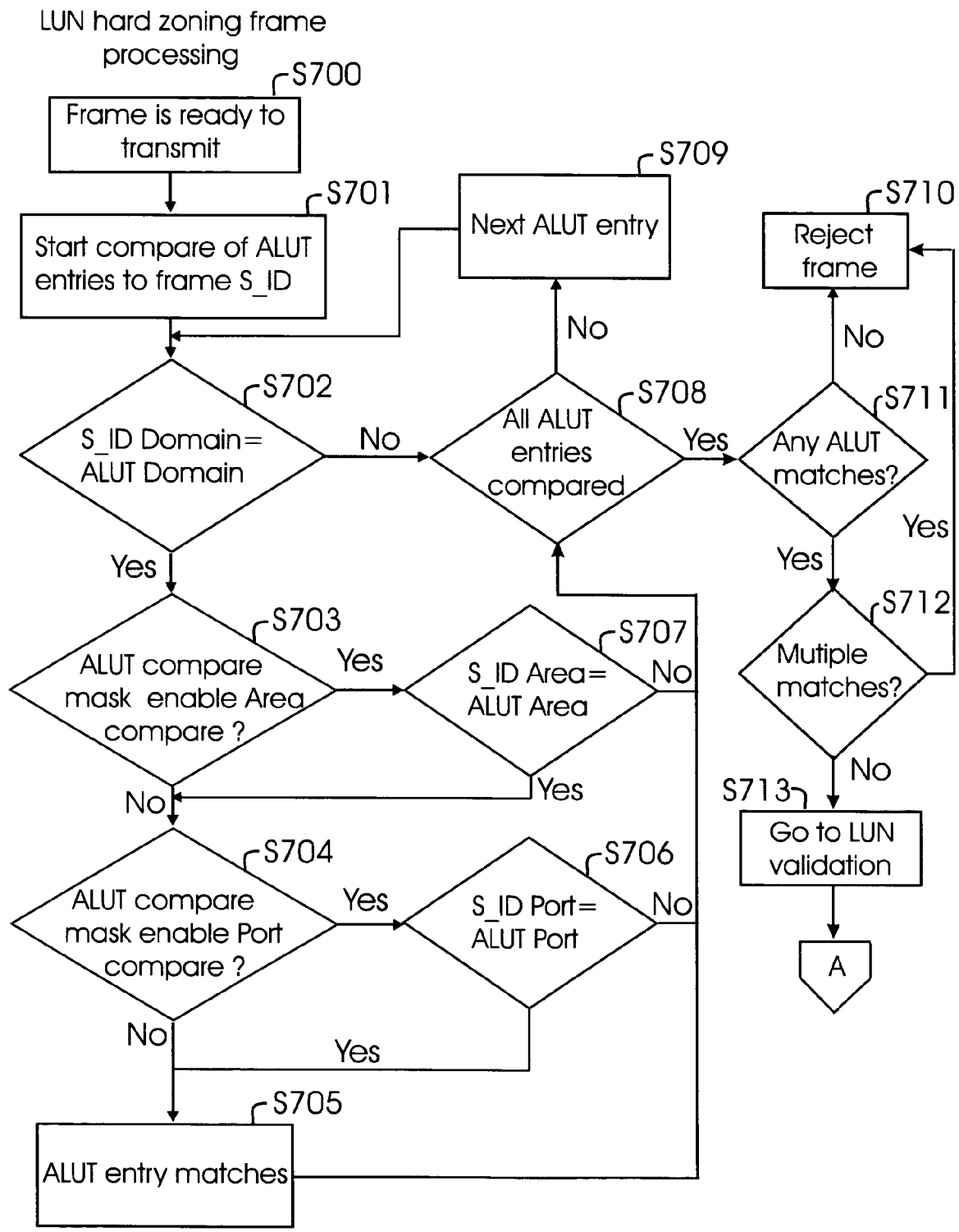
FIG. 7A-7B (collectively referred to as FIG. 7) show a flow diagram for LUN based hard zoning frame processing, according to one aspect of the present invention.
Figure 7B:
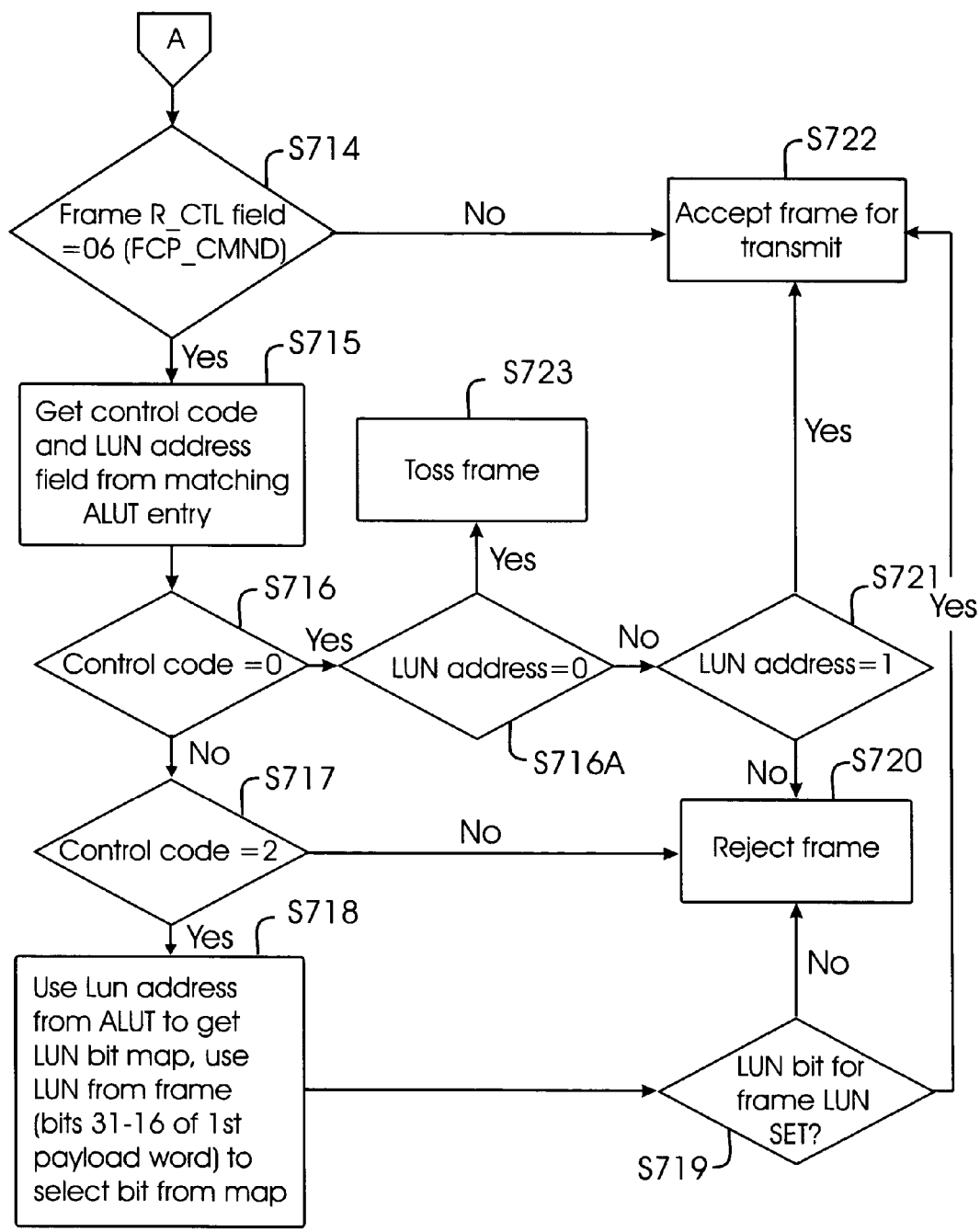

FIGS. 7A-7B (collectively referred to as FIG. 7) show a flow diagram for LUN based hard zoning frame processing. The process starts in step S700 when a frame is ready to be transmitted from a port. In step S701, the process compares a frame's S_ID 501 with ALUT 323A entries. This is performed by compare module 500.

In step S702, the process determines if the S_ID domain value matches with the ALUT domain values. If the values do not match, then in step S708, the process determines if all ALUT 323A entries have been compared. If all ALUT 323A entries have not been compared the, process moves to step S709 and then back to S702.

If all ALUT entries have been compared in step S708, then in step S711, the process determines if there are any ALUT 323A matches. If there are no matches, then in step S710, the process rejects the frame.

If there is a match in step S711, then the process determines in step S712 if there are multiple matches. If there are multiple matches, then the frame is rejected in step S710. If there are no multiple matches, then in step S713, the LUN is validated, as described below (FIG. 7B).

In step S703, the process determines if the Area field comparison is enabled. If the Area field is not enabled, the process moves to step S704. If enabled, then in step S707, the process determines if ALUT 323A entry matches the frame area field. If there is a match, the process moves to step S704. If there is no match, then the process moves to step S708.

In step S704, the process determines if Port field comparison is enabled. If the port field comparison is enabled, then the port field of the frame is compared to the ALUT 323A port field in step S706. If the fields do not match, the process moves to step S708. If the frame and ALUT 323A port fields match, then the process moves to step S705, where an ALUT match is confirmed and the process moves to step S708.

In step S714, the process determines if the frames R_CTL field value is equal to that of the FCP-CMD (for example 06), then in step S715, control code 506 and LUN address 507 is obtained from the matching ALUT 323A entry. If the R_CTL field of the frame is not equal to the FCP_CMND value, then in step S722, the process accepts the frame for transmission.

In step S716, the process determines if the control code 506 value is zero. If the control code 506 is zero, then in step S716A, the process determines if LUN address 507 is zero. If it is zero, then the frame is tossed in step S723.

If the LUN address 507 is 1 (i.e. not 0), as determined in step S721, then the frame is accepted in step S722.

If the LUN address 507 is not equal to 1, then the frame is rejected in step S720.

In step S717, the process determines if the control code 506 is 2. If it is, then in step S718, the LUN address from ALUT 323A is used to get the LUN bitmap and if the LUN bit for the frame LUN is set in step S719, then the frame is accepted in step S722, otherwise it is rejected in step S720.

It is noteworthy that the foregoing process is not limited to any particular code or bit value. Any value(s) may be designated to implement the foregoing process steps.

Rejected Frame Disposition:

The frames that are rejected may be disposed by a programmable policy. In one aspect of the present invention, the frame may be disposed as follows:

Class 3 frames:
Discard frame; or
Send frame to IOP 66
Class 2 frames:
Send frame to IOP 66
Send truncated frame (FC header minus CRC and EOF code) to IOP 66.

Since Class 2 frames acknowledge all data frames, the truncated frame is sent to IOP 66 so that a class 2 "F_RJT" primitive can be used to acknowledge the frame. The frame can be truncated to avoid moving the entire frame if the payload is not going to be used.

Statistics Counters/Status Registers:

In one aspect of the present invention, statistics counters 327 includes two counters for ports using LUN hard zoning:

A first counter counts the number of hard zoning violations that are detected; and A second counter counts the number of class 3 frames that are discarded because of hard zoning violations.

It is noteworthy that an ALUT 323A entry with control code 506 value of 0 and LUN map address 507 value of 0 causes a frame to be tossed (step S720), regardless of the rejected frame policy. In this case, the statistic counters 327 are not incremented. This can be used against a denial of service attack (flooding a port with frames, and forcing the port to process them). If detected, an ALUT 323A entry can be programmed to toss the frames, avoiding any further overhead in processing or transmitting the frames. Status Register 324 bit indicates violations and tossing of different frame classes.

Modifying SCSI REPORT LUNS Reply Data (Soft LUN Zoning)

SCSI initiators use the "REPORT LUNS" command to discover LUNs on a SCSI target. If some of the LUNS reported by the reply to REPORT LUNS command are filtered by LUN hard zoning, attempts by the initiator to access these will fail causing errors to be reported. To prevent this, in one aspect of the present invention, a method is provided to intercept the reply to a REPORT LUNS command, edit the reply to remove unauthorized LUNs, and then pass it to the initiator.

Alias cache 315 allows frames to be routed depending on multiple fields in the header or payload. One of the routing choices is to send the frame to IOP 66 processor. A reply to a REPORT LUNS command is identified by matching the Fibre Channel header fields S_ID, D_ID, and OX_ID of the reply to the D_ID, S_ID, and OX_ID of the original REPORT LUNS command. To edit the reply, the REPORT LUNS commands are intercepted by IOP 66 to get the fields needed.

In one aspect of the present invention, the following procedure is used:

On all switch ports that receive FCP_CMND REPORTS LUNS commands from a SCSI initiator for the targets where LUN zoning is being applied to, alias cache 315 is set up to route REPORT LUNS commands to IOP 66, for example if:
  R_CTL=hex 06 (FCP_CMND);
  Type=hex 08 (SCSI FCP protocol);
  Payload word 3, most significant byte=hex A0 (REPORTS LUNS command); and
  then route to IOP 66.

When a REPORT LUNS command is sent to IOP 66, it checks if the destination is a target using LUN zoning. If it is, alias cache 315 for that port is programmed to route the reply frame to IOP 66, for example:
  If R_CTL=hex 01 (FCP_DATA);
  D_ID=S_ID of REPORTS LUNS command;
  OX_ID=OX_ID of REPORT LUNS command; and
  then route to IOP 66 ; and
  then the trapped REPORT LUNS command is sent to its destination.

When the reply for REPORT LUNS is sent to IOP 66, IOP 66 removes the LUNs in the payload that are not authorized for the initiator. It then clears alias cache 315 entries for the reply. The edited REPORT LUNS reply is then sent to the original command initiator.

Figure 6:
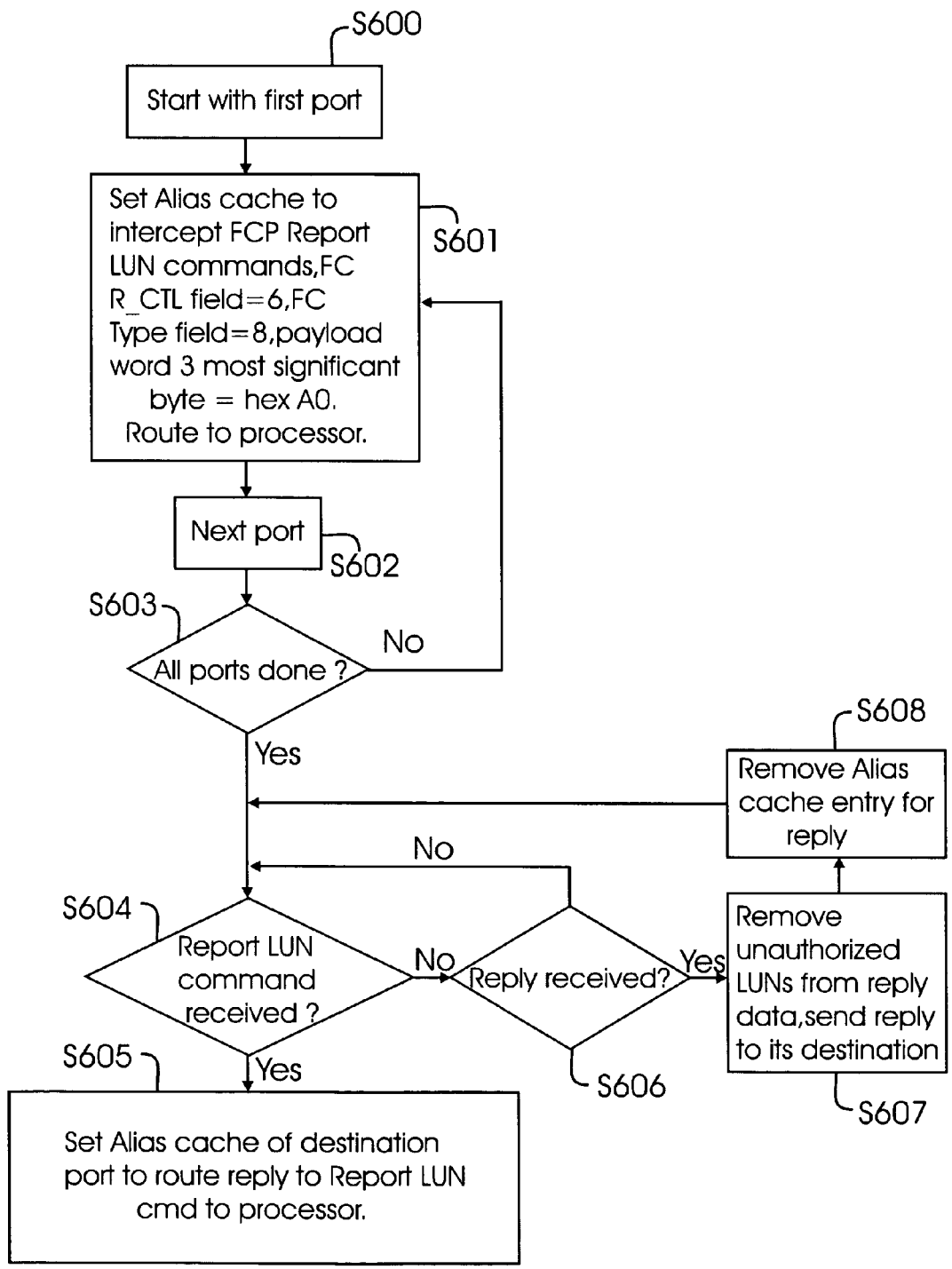
FIG. 6 shows a flow diagram for modifying SCSI LUN reports, according to one aspect of the present invention.

FIG. 6 shows a flow diagram for the foregoing process for modifying SCSI LUN REPORTS. The process starts in step S600 with the first port.

In step S601, alias cache 315 is set to intercept FCP REPORT LUN commands, so that the commands are routed to IOP 66. For example, if, R_CTL=hex 06 (FCP_CMND); Type=hex 08 (SCSI FCP protocol); and payload word 3, most significant byte=hex A0 (REPORTS LUNS command), then a REPORT LUN command is routed to IOP 66.

The process moves to the next port in step S602, until all the ports are set in step S603.

In step S604, the process determines if a REPORT LUN command is received. If true, then in step S605, alias cache 315 of the destination port is set to route the reply to the REPORT LUN command to IOP 66.

If a REPORT LUN command is not received in step S604, then the process determines if a reply has been received in step S606. If a reply is not received, the process goes back to step S604.

If a reply is received in step S606, then in step S607, unauthorized LUN data is removed from the reply data and the reply is sent to the destination. Thereafter, alias cache 315 entry are cleared for replies and the process moves back to step S604.

Although the present invention has been described with reference to specific embodiments, these embodiments are illustrative only and not limiting. Many other applications and embodiments of the present invention will be apparent in light of this disclosure and the following claims.

What is claimed:

1. A method for processing frames using logical unit number (LUN) based hard zoning in a fibre channel network, comprising the steps of:
   (a) receiving a frame at a fibre channel port of a fibre channel switch element;
   (b) comparing a source identifier field in the frame using a look up table having a plurality of entries; wherein based on a compare mask, one or more of a Domain value, an Area value and a port identifier value in the source identifier of the frame is compared with the plurality of look up table entries;
   (c) rejecting the frame if multiple entries in the look up table match the source identifier field in the frame;
   (d) rejecting the frame after a match is found in step (b) and if a control code has a first value and a LUN table address field has a first value, wherein the LUN table address field is interpreted based on the control code value;
   (e) transmitting the frame, after the source identifier field in the frame matches a look up table entry in step (b) and if the control code has the first value and the LUN address field has a second value, which identifies a valid LUN;
   (f) using a LUN value in the frame to index a LUN bit map table, if (i) the frame is an FCP_CMD, (ii) the control code has the second value and (iii) the source identifier field in the frame matches a look up table entry; and if an entry in the LUN bitmap table corresponding to the LUN value in the frame is set, then the frame is accepted, otherwise, the frame is rejected; and
   (g) transmitting the frame (i) if the frame is a non_FCP_CMND, (ii) if the source identifier field in the frame matches a look up table entry and (iii) if the control code has the second value.

2. The method of claim 1, wherein if the frame is rejected, then the rejected frame is disposed based on a programmable policy that is established by a user.

3. The method of claim 1, wherein the look up table for comparing the source identifier is an address look up table ("ALUT").

4. The method of claim 3, wherein a frame's S_ID domain value is compared to ALUT entries during the comparison step.

5. The method of claim 2, wherein based on the programmable policy, a Class 3 fibre channel frame is either discarded or sent to a processor; a Class 2 Fibre Channel frame is sent to the processor; and a truncated frame without cyclic redundancy code (CRC) and end of frame (EOF) delimiter is sent to the processor so that a reject primitive is sent to acknowledge the frame.

6. The method of claim 1, wherein a first counter counts a number of hard zoning violation.

7. The method of claim 6, wherein a second counter is used to count the number of Class 3 frames that are discarded due to hard zoning violations.

8. The method of claim 7, wherein the frame is discarded regardless of a frame rejection policy if the control code has the first value ant the LUN address field has the first value, such that the first counter and the second counter values are not incremented as a measure against a denial of service attack.

9. A Fibre Channel switch element for processing Fibre Channel frames using logical unit number (LUN) based hard zoning, comprising:
   a port for receiving a frame with a source identifier;
   an address look up table (ALUT) storing a plurality of entries for routing the frame; and
   a compare module using a compare mask for comparing one or more of a Domain value; an Area value and a port identifier value in a source identifier in the received frame with an ALUT entry; wherein (a) the frame is rejected if multiple entries in the ALUT match the source identifier field in the frame; (b) the frame is rejected if a control code has a first value and a LUN table address field has a first value; where the control code value is used for interpreting the LUN table address field,(c) the frame is transmitted, after the source identifier field in the frame matches an ALUT entry and if the control code has the first value and the LUN address field has a second value; and (d) the frame is transmitted if the frame in a non_FCP_CMND, the source identifier field in the frame matches an ALUT entry and the control code has the second value; and
   wherein a LUN value in the frame is used to index a LUN bit map table, if (a) the frame is an FCP_CMD, (b) the control code has the second value and (c) the source identifier field in the frame matches a look up table entry and if an entry in the LUN bitmap table corresponding to the LUN value in the frame is set, then the frame is accepted, otherwise, the frame is rejected.

10. The switch element of claim 9, wherein if the frame is rejected, then the rejected frame is disposed based on a programmable policy that is established by a user.

11. The switch element of claim 9, wherein a frame's S_ID domain value is compared to entries stored in the ALUT.

12. The switch element of claim 10, wherein based on the programmable policy, a Class 3 fibre channel frame is either discarded or sent to processor; a Class 2 Fibre Channel frame is sent to the processor; and a truncated frame without cyclic redundancy code (CRC) and end of frame (EOF) delimiter is sent to the processor so that a reject primitive is sent to acknowledge the frame.

13. The switch element of claim 9, wherein a first counter counts a number of hard zoning violations.

14. The switch element of claim 13, wherein a second counter is used to count the number of Class 3 frames that are discarded due to hard zoning violations.

15. The switch element of claim 14, wherein the frame is discarded regardless of frame rejection policy if the control code has the first value and the LUN address field has the first value, such that the first counter and the second counter values are not incremented as a measure against a denial of service attack.

16. The method of claim 3, wherein based on an ALUT control code value frame is tossed.

17. The method of claim 3, wherein based on an ALUT control code value access is allowed to all LUNs.

18. The method of claim 3, wherein based on an ALUT control code value LUN compare is performed.

19. The switch element of claim 9, wherein based on an ALUT control code value a frame is tossed.

20. The switch element of claim 9, wherein based on an ALUT control code value access is allowed to all LUNs.

21. The switch element of claim 9, wherein based on an ALUT control code value LUN compare is performed.

22. The method of claim 1, wherein hard-zoning is performed based on a frame's S_ID value when a frame does not include LUN information.

23. The switch element of claim 9, wherein hard-zoning is performed based on a frame's S_ID value when frame does not include LUN information.

24. The method of claim 1, wherein hard-zoning is based on a frame field.

25. The switch element of claim 9, wherein hard-zoning is based on a frame field.

* * * * *

UNITED STATES PATENT AND TRADEMARK OFFICE
CERTIFICATE OF CORRECTION

PATENT NO. : 7,466,700 B2 Page 1 of 1
APPLICATION NO. : 10/894492
DATED : December 16, 2008
INVENTOR(S) : Frank R. Dropps et al.

It is certified that error appears in the above-identified patent and that said Letters Patent is hereby corrected as shown below:

In the Specifications:

In column 6, line 34, delete "receiver" and insert -- receive --, therefor.

In column 6, line 52, delete ""OE")." and insert -- "OE"), --, therefor.

In column 6, line 52, after "connected" insert -- with --.

In the Claims:

In column 15, line 55, in claim 8, delete "ant" and insert -- and --, therefor.

In column 16, line 9, in claim 9, delete "an" and insert -- the --, therefor.

In column 16, line 12, in claim 9, delete "in a" and insert -- is --, therefor.

In column 16, line 13, in claim 9, delete "an" and insert -- the --, therefor.

Signed and Sealed this

Twenty-sixth Day of October, 2010

David J. Kappos
*Director of the United States Patent and Trademark Office*